(12) United States Patent
Nowak et al.

(10) Patent No.: US 9,741,157 B2
(45) Date of Patent: Aug. 22, 2017

(54) PREVIEWING CHANGES ON A GEOMETRIC DESIGN

(71) Applicant: Onshape Inc., Cambridge, MA (US)

(72) Inventors: K. Evan Nowak, St. Paul, MN (US); Michael Lauer, Harvard, MA (US)

(73) Assignee: Onshape Inc., Cambridge, MA (US)

( * ) Notice: Subject to any disclaimer, the term of this patent is extended or adjusted under 35 U.S.C. 154(b) by 0 days.

(21) Appl. No.: 14/226,042

(22) Filed: Mar. 26, 2014

(65) Prior Publication Data

US 2015/0348312 A1    Dec. 3, 2015

(51) Int. Cl.
*G06T 15/10* (2011.01)
*G06T 17/10* (2006.01)
*G06T 19/20* (2011.01)
*G06F 3/00* (2006.01)
*G06F 3/0484* (2013.01)

(52) U.S. Cl.
CPC ........... *G06T 15/10* (2013.01); *G06F 3/00* (2013.01); *G06F 3/04847* (2013.01); *G06T 17/10* (2013.01); *G06T 19/20* (2013.01); *G06T 2219/028* (2013.01); *G06T 2219/20* (2013.01); *G06T 2219/2021* (2013.01)

(58) Field of Classification Search
CPC ..................................................... G06F 17/50
See application file for complete search history.

(56) References Cited

U.S. PATENT DOCUMENTS

| | | | |
|---|---|---|---|
| 5,999,195 A | 12/1999 | Santangeli | |
| 6,219,055 B1 | 4/2001 | Bhargava et al. | |
| 7,936,352 B2 | 5/2011 | Baran et al. | |
| 8,290,257 B2 | 10/2012 | Demirli et al. | |
| 8,560,933 B2 | 10/2013 | Doan et al. | |
| 2005/0140678 A1 | 6/2005 | Gielis et al. | |
| 2005/0157170 A1* | 7/2005 | Morishima | H04N 7/18 348/161 |
| 2006/0119601 A1* | 6/2006 | Finlayson | G06T 15/20 345/427 |
| 2006/0133694 A1 | 6/2006 | Dewaele | |
| 2007/0067211 A1* | 3/2007 | Kaplan | G06Q 10/04 705/7.31 |

(Continued)

OTHER PUBLICATIONS

Pasko, Adzhiev, Sourin, & Savchenko, Function representation in geometric modeling: concepts, implementation and applications, The Visual Computer, 1995, pp. 429-446, vol. 11, US.

*Primary Examiner* — Kee M Tung
*Assistant Examiner* — Grace Q Li
(74) *Attorney, Agent, or Firm* — Clocktower Law; Erik J. Heels; Michael A. Bartley

(57) ABSTRACT

Describe is a method for visually presenting, or previewing, changes to 3-dimensional geometry. In Onshape, a user may apply a sequence of configurable geometric operations in order to design a 3-dimensional model. When a user edits a specific operation, the method provides a way for the user to see the effects changes will have on a model. The method provides high-fidelity visualizations of the user's design as it would be before the operation is applied, after the operation is applied, and the operation's effects in conjunction with the effects of all operations in the sequence. The method also provides an interface for transitioning between these visualized states, allowing the user to effectively and efficiently understand the effect of the changes.

10 Claims, 7 Drawing Sheets

(56) References Cited

U.S. PATENT DOCUMENTS

| | | |
|---|---|---|
| 2009/0202173 A1* | 8/2009 | Weiss ................... H04N 1/62 |
| | | 382/276 |
| 2010/0037178 A1 | 2/2010 | Queric |
| 2011/0134123 A1 | 6/2011 | Salcolm et al. |
| 2011/0145760 A1 | 6/2011 | Radet et al. |
| 2011/0167398 A1* | 7/2011 | Furumoto ............... G06F 17/50 |
| | | 716/112 |
| 2012/0218254 A1 | 8/2012 | Abeln |
| 2012/0272192 A1* | 10/2012 | Grossman ............. G06F 3/0484 |
| | | 715/854 |
| 2013/0235070 A1 | 9/2013 | Webb |
| 2014/0067106 A1 | 3/2014 | Makeig |

* cited by examiner

PREVIEWING CHANGES ON A GEOMETRIC DESIGN

CROSS-REFERENCE TO RELATED APPLICATIONS

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2014 Onshape Inc.

BACKGROUND

Field of Technology

This disclosure relates to computer aided design, and more specifically visualizations for three-dimensional computer aided design software.

Background

The market for this product includes businesses and individuals that want to precisely and efficiently create product designs. For example, such a business could be a company that manufactures car parts for major automakers. This business could use this invention to assist in their design of new parts prior to their manufacture.

Three dimensional computer aided design (3D CAD) is a type of software that enables users to design real-world objects, such as machines and other commercial products. 3D CAD software is differentiated from 2D CAD software in that it displays users' designs as 3D objects, as opposed to 2D layers of a 3D object. Visualizations are interactive, pictorial representations of users' designs that assist in the understanding of their work.

DESCRIPTION OF PRIOR ART

SolidWorks is a software system for 3D CAD available through solidworks.com. SolidWorks allows its users to perform geometric operations on their design. These operations are applied in a sequence. When a user edits a particular operation in the sequence, they are given a preview of the result of that operation. This preview shows the effect that operation will have at that point in the sequence. The preview is rendered in a style such that the geometry that is the result of the operation is shown with transparent surfaces, with highlighted edges in-between the surfaces. This preview functionality is also mentioned in SolidWorks patents, including U.S. Pat. No. 6,219,055, "COMPUTER BASED FORMING TOOL," issued Apr. 17, 2001, with inventors Rahul Bhargava, Gopal Shenoy, Robert P. Zuffante, and Jon K. Hirschtick, and U.S. Pat. No. 7,936,352, "DEFORMATION OF A COMPUTER-GENERATED MODEL," issued May 3, 2011 with inventors Ilya Baran, Scott Harris, Lana Saksonov, Saul Rothstein, and Robert Zuffante.

Creo is a software system for 3D CAD available through ptc.com. Creo allows the user to apply a sequence of geometric operations to produce a design. While a user is editing a specific operation in the sequence, they will be shown a preview of that operation's effect on the design.

Fusion is a software system for 3D CAD available through autodesk.com. Unlike SolidWorks and Creo, Fusion does not have a sequence of operations that can be edited at a later time. Though Fusion allows the user to adjust their design with geometric operations, after each operation is performed the effect cannot be changed. Hence while the user is specifying a geometric operation, their preview always shows the effect on the final state of the design.

SolidEdge is a software system for 3D CAD available through www.plm.automation.siemens.com. Unlike SolidWorks and Creo, SolidEdge does not have a sequence of operations that can be edited at a later time. Though SolidEdge allows the user to adjust their design with geometric operations, after each operation is performed its effect cannot be changed. Hence while the user is specifying a geometric operation, their preview always shows the effect on the final state of the design.

The above solutions allow preview of only one operation, the operation currently being edited, and in many cases do not have the capability of editing prior operations. None of the above provides a preview feature which transitions between before and after states of applying a geometric operation, or of dynamic selection within a chain of geometric operations to preview at that specific point. What is needed, therefore, is a system that overcomes the above-mentioned limitations and that includes the features enumerated above

BRIEF SUMMARY

Onshape is a software system that allows its users to create digital designs. These designs can be used to guide the manufacture of real-world products. The system enables users to create designs by applying a sequence of geometric operations to build up a 3D model. The system applies the sequence of operations in order to create the final design. For instance, a user may apply an "extrude" operation to extend a facet of the model into space. At any point, a user may edit any of the geometric operations in the sequence.

A preview option is a component of Onshape that is used for visualizing the effects that an operation will have on a user's design. The preview component provides a user interface that enables the user to change the visualization in order to see an operation's effects at different points in the sequence: the point immediately after the operation, the point before the operation, and the point at which all operations in the sequence have been applied. The interface allows the user to transition or slide the visualization between the before and after points in order to see its immediate effect. This transition shows a blending of the two states so that a user may better understand the effect an operation will have. When the user wants to see its final effect on the design, they can click on a Preview button to see a view of the final design.

Features and Advantages

This method provides multiple advantages over previous preview methods.

The ability for a user to quickly transition between visualization of the three states allows users to do their job more efficiently. Imagine a system that does not allow viewing the effect an operation has on the final design. In such a system, users need to edit the operation, make a change, and then exit the operation to see the effect of the change. If the resulting effect was not intended, the user needs to go back and edit the operation again. This process is repeated until the desired effect is achieved. By contrast, with the disclosed method a user can start editing an operation and switch the visualization to show the final design. The user thus can edit the operation while seeing the effect on the final design. This eliminates several steps the user must take under prior systems, and enables more efficient operation.

Another advantage is in the fidelity of the visualization. Existing systems show previews of altered geometry with coarse, wireframe representations. Users do not see the result in full fidelity until they are done editing an operation. This means that if the coarse representation did not faithfully represent the operations effect, the user needs to go back and edit the operation again, and repeat the process until the desired effect is achieved. With the disclosed method, a user is able to see the full-fidelity result while they are in the process of editing an operation, avoiding repetition needed due to inaccuracy.

A further advantage is that the disclosed method allows the user to quickly transition the visualization between the state before an operation is applied and the state immediately after it is applied. The ability to blend the two states allows the user to gain an understanding of how the design's geometry has changed, while maintaining a full-fidelity visualization of both states.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

The terminology and definitions of the prior art are not necessarily consistent with the terminology and definitions of the current invention. Where there is a conflict, the following definitions apply.

Design—The artifact the user is creating. In 3D CAD systems, this is a set of 3D geometry that can serve as a reference for manufacture. It includes geometric operations that produce the geometry and other ancillary geometry.

Model—The 3D geometry that is the result of the geometric operations.

Geometric operation—An action a user may take in a 3D CAD system in order to affect the geometry of their design. A 3D CAD system provides a set of operations, each affecting the design in different ways. One example of an operation is the "extrude" operation. A user can apply the extrude operation to extend a facet of the model into 3D space.

Geometry service—A software component in the software that applies the sequence of geometric operations in order to produce the user's design.

Renderer—A software component that takes the result of the geometry service and produces a two-dimensional visual image.

Compositor—A software component that takes two different images from the Renderer and joins them in a such images are represented in a third image.

Display—A device, such as a computer screen, for presenting an image to the user.

Operation

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present invention.

3D CAD programs are software operated on a computing device with input devices, such as a mouse and keyboard, for a user to control the software program, and display devices, such as a monitor, to visualize the program to the user. The 3D CAD program may be stored permanently or temporarily by the computing device, on removable media, on remote media, or implemented on dedicated hardware within the computing device. In distributed solutions, 3D CAD programs may be operated on servers communicating with the computing device, with the computing device controlling input/output and the server executes the CAD processing. Typically, the computing device has internal or external storage devices, or is connected to storage devices such as over network, with the storage devices storing data, including designs, for the user and used by the 3D CAD program.

Figure 1:
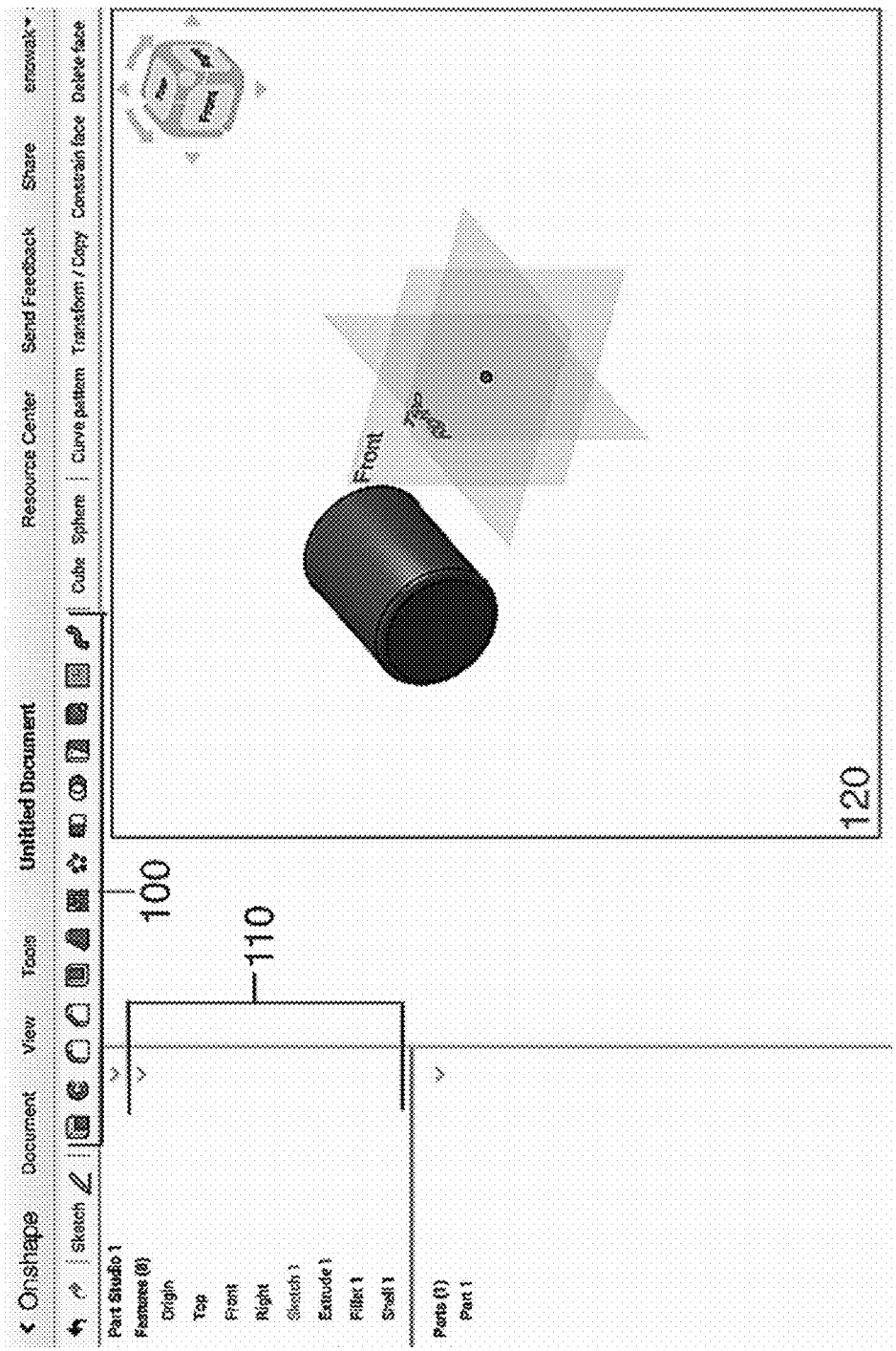
FIG. 1 shows the Onshape user interface when the application is started.

Referring to FIG. 1, when using the 3D CAD program, the user is shown a representation 120 of a design on a display along with user interfaces for editing the design. If the user has not yet made any geometric operations, the model will be empty. If geometry operations have already been applied in the design, the model includes the result of those operations and will be shown to reflect that state.

The process for utilizing a geometric preview begins by starting an edit of a geometric operation. A user does this either by starting a new operation, or editing an existing operation. Using an input device, such as a mouse, the user may interact with user interface controls 100 to start a new operation. Alternatively, the user may use the input device to select an existing operation to edit from a sequence of existing operations 110 displayed within the interface. Depending on the interface design of the particular 3D CAD software, and state within the operating program at the time the user desires to preview, multiple input device actions may be required to display and interact with the interface controls to start a new operation or edit an existing operation.

Figure 2:
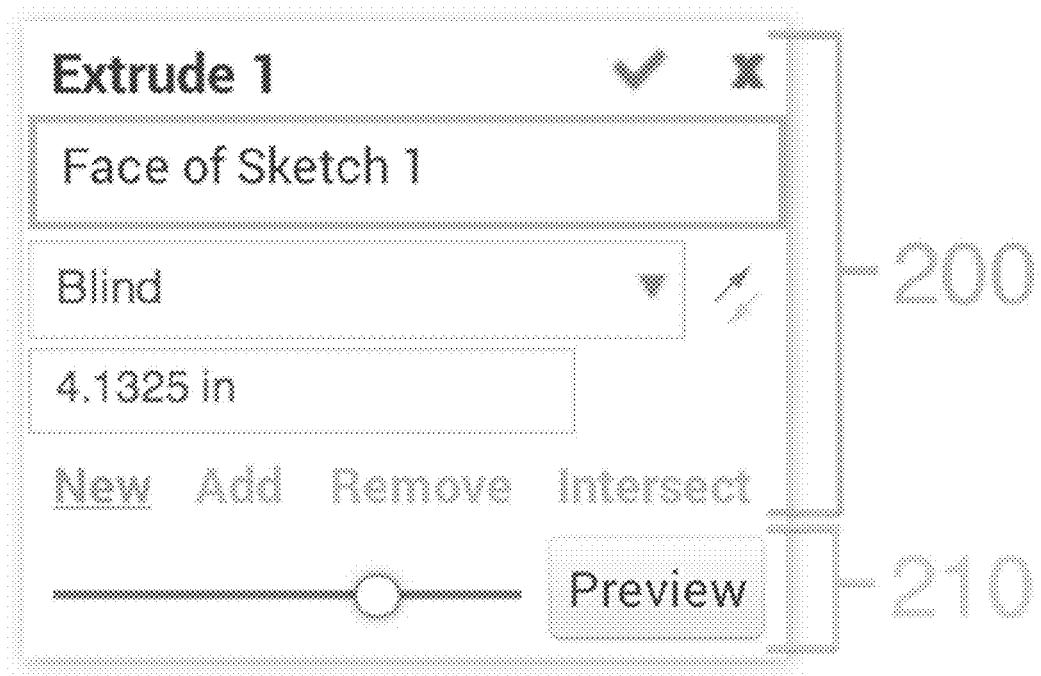
FIG. 2 shows a user interface displayed to the user when they are editing an operation.
Figure 3:
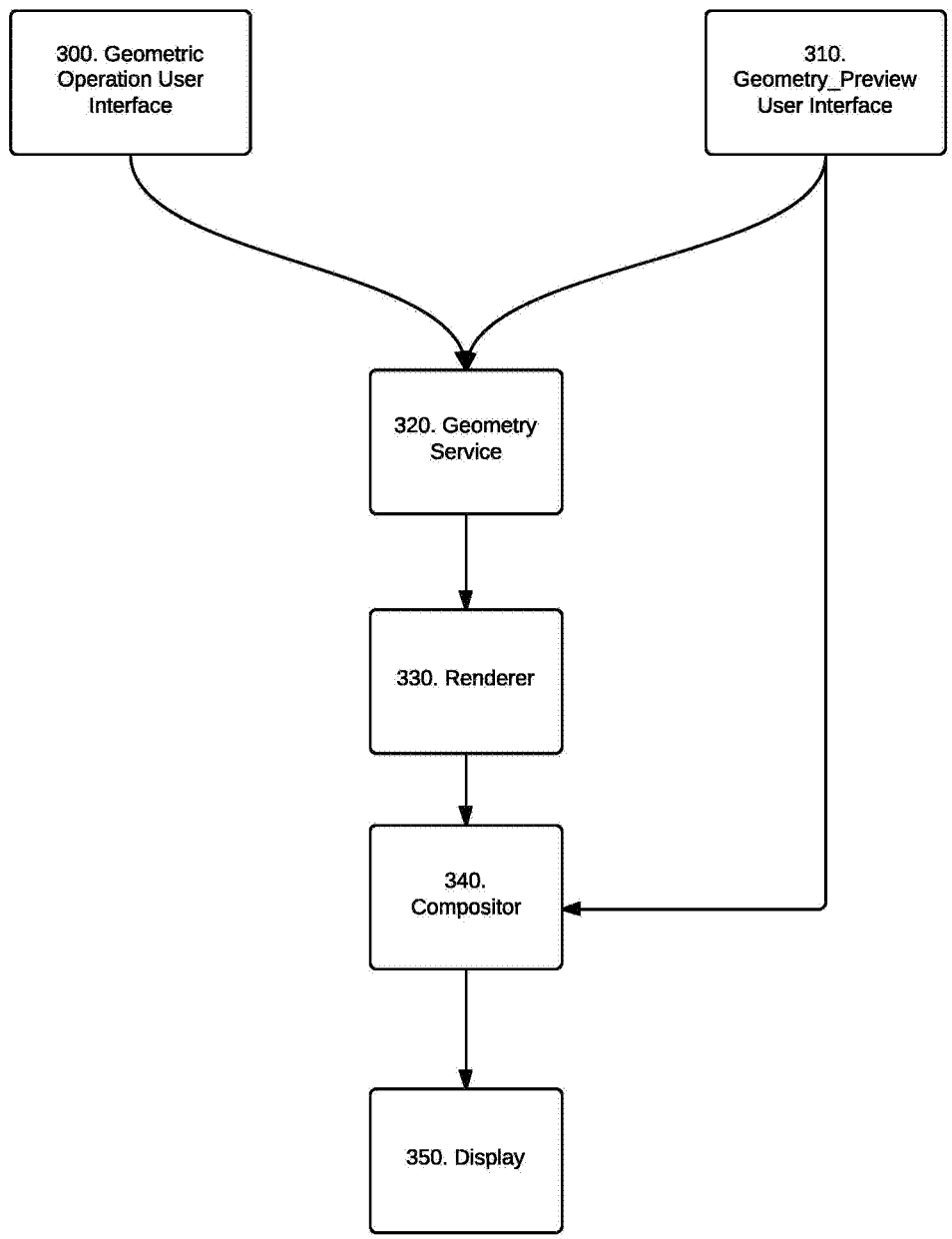
FIG. 3 is flow chart showing from user input, through the difference components of the system, and leading to the display of the output.

Referring also to FIGS. 2 & 3, once the user begins an edit, the 3D CAD software displays geometric interface controls 300 in the user interface which adjust the parameters for the operation, and ultimately change the effect the operation will have on the design. Such controls may be connected or separate from the main user interface, and grouped together or individually. Some controls may be nested requiring selection or activation of other controls before they are displayed or accessible. A preview control interface 310 may be attached to, or included with, this interface. Traditional controls 200 allow for configuring parameters of the operation, and preview control 210 controls preview display. A preferred embodiment is as a slider with a "preview" or "final state" button, but other user interface components may be used as part of the control, such as radio boxes instead of a slider, or inclusion of the "preview" button as a final position within the slider. Different operations may have different traditional controls, depending on the specific parameters applicable for the specific operation, but all operations may have the preview control applied.

When editing a geometric operation begins, the software communicates to a geometry service 320 that the user is editing the specific geometric operation. The geometry service is responsible for taking the specifications for the sequence of operations and returning the resulting model geometry. When the geometry service receives the message that a user has begun editing a geometric operation, it produces two sets of geometry: one corresponding to the geometry for the sequence of operations up to (before) the edited operation; and one corresponding to the geometry for the sequence of operations up to and including (after) the edited operation. These two sets of geometry are now relayed to the renderer 330.

The renderer is responsible for taking the 3D geometry from the geometry service and transforming it into a pictorial image. The renderer may use standard techniques for transforming geometry into pictures, such as OpenGL. At the end of its process, its output includes an array of numbers representing the colors for each pixel in the image.

Figure 4:
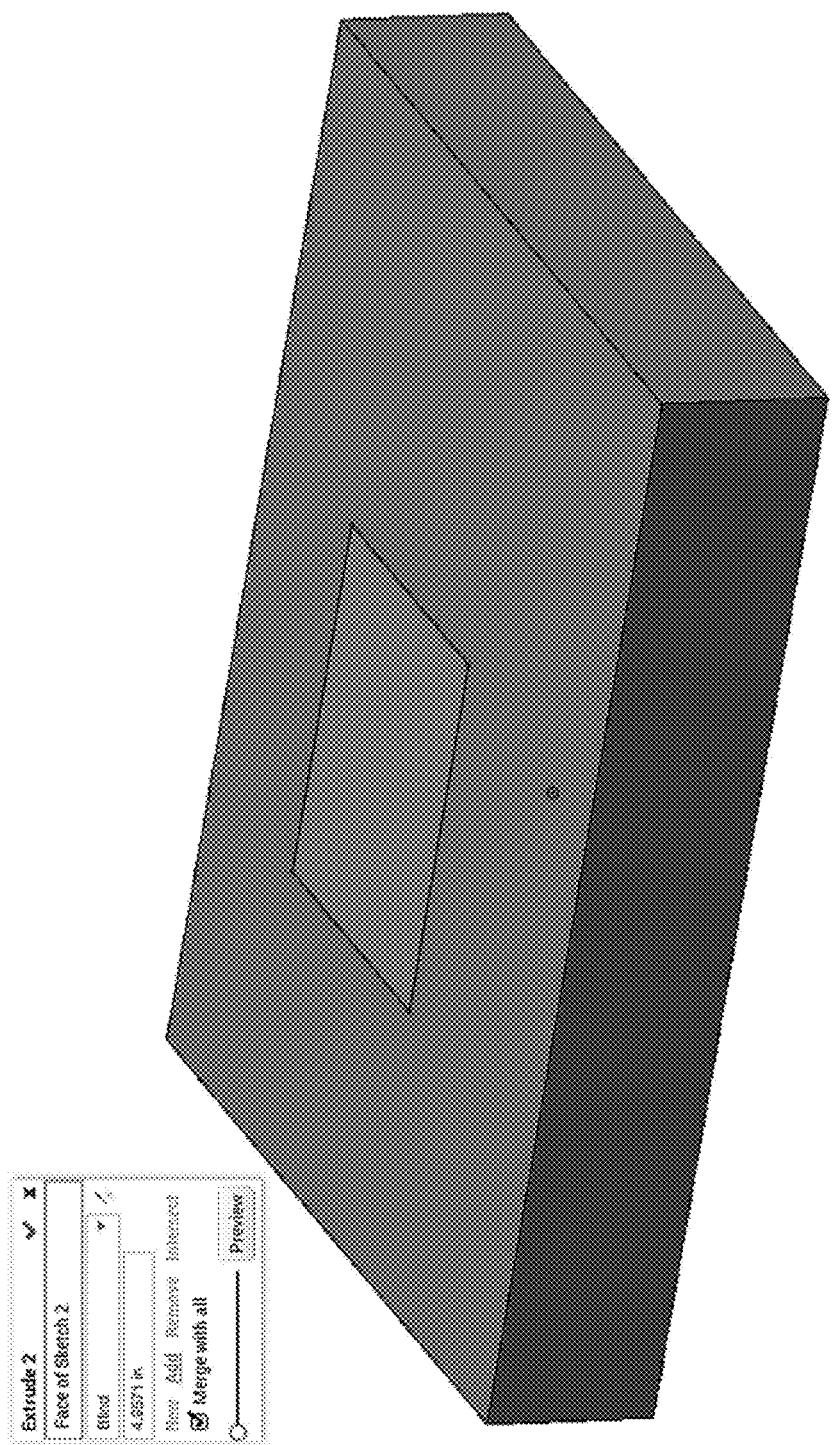
FIG. 4 shows a preview visualization of the model in the state before the actively edited operation.
Figure 5:
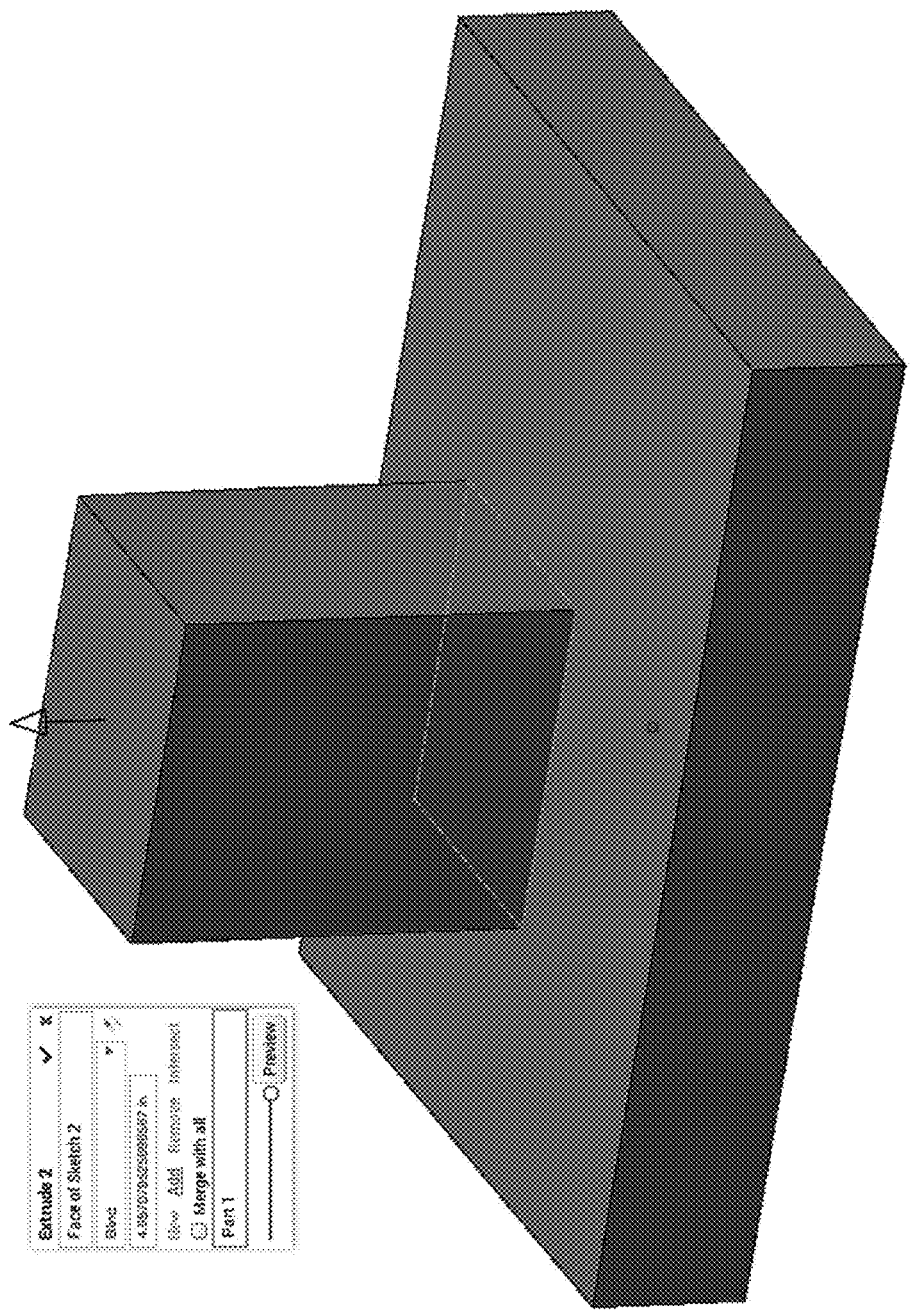
FIG. 5 shows a preview visualization of the model in the state after the actively edited operation.

The renderer takes each of the two sets of geometry received from the geometry service and produces two separate images (Image1 and Image2). Next, a compositor combines the two images into a third image (Image3) that can be displayed. The compositor 340 uses the preview control to determine the proportion of each image (Image1 and Image2) in the final result (Image3). In the preferred embodiment, the preview control is a slider with covering a range from 0 to 100% (or mappable to such range). The compositor assigns 100%—the slider value to the percentage to use for Image1, and the slider value to the percentage to use for Image 2. Thus, if the slider is exactly in the middle it uses half of the value from Image1 and half the value from Image2 to produce Image3. As shown in FIG. 4, if the slider is entirely to the left, it uses all of the value from Image1 and none of the value from Image2 to produce Image3, effectively copying Image1. As shown in FIG. 5, if the slider is entirely to the right, it uses none of the value from Image1 and all of the value from Image2, effectively copying Image2. When Image3 has been produced, it is shown in the display 350 such as the display representation 120.

Figure 6:
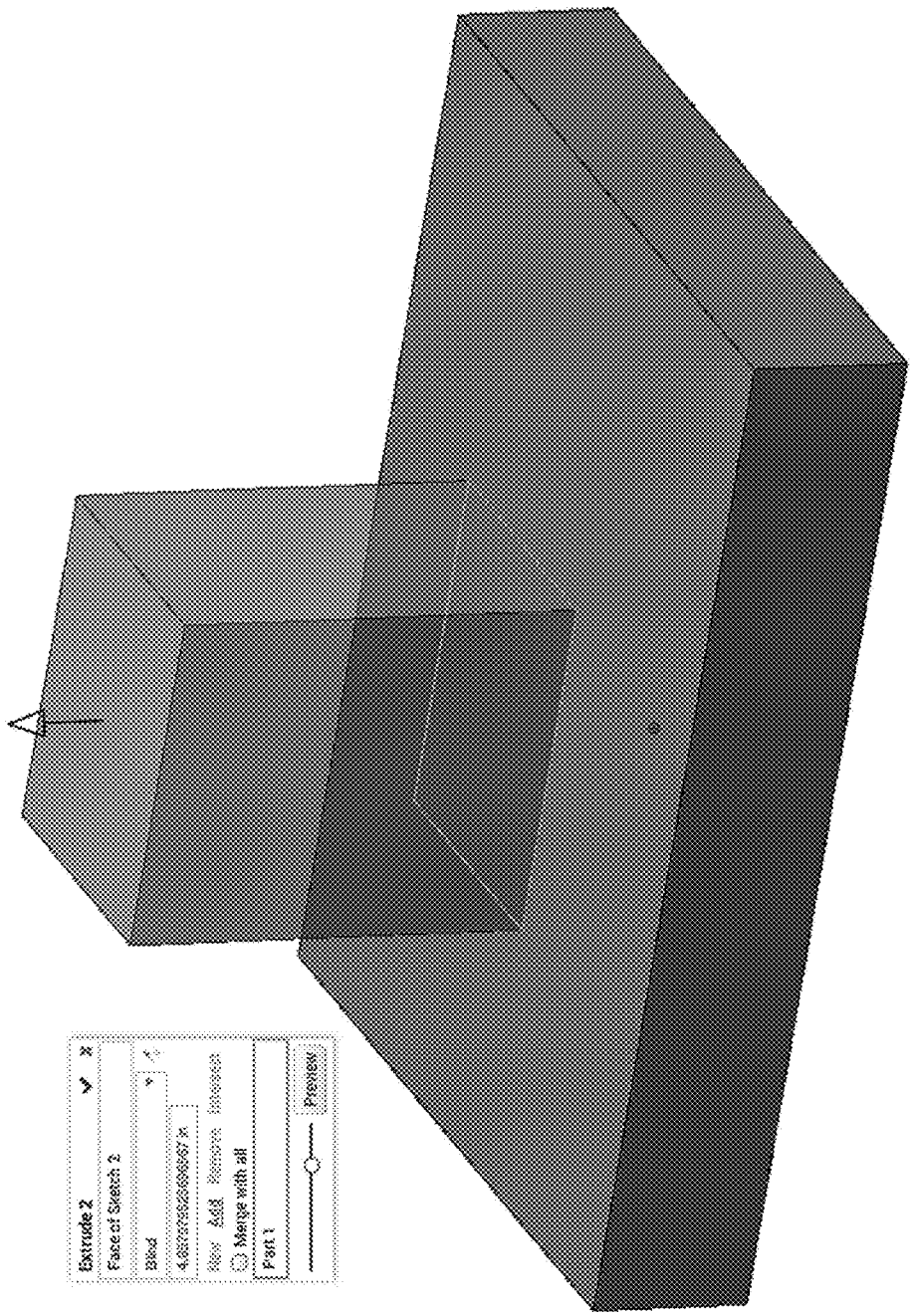
FIG. 6 shows a preview visualization of the model showing the result of the combined before and after states.

The user can adjust slider controls 210 to alter the displayed representation. In the preferred embodiment, as the user moves the slider the compositor reacts by mixing Image1 and Image2 in different ratios based on the moved slider position. Once the new image has been created, the displayed representation is updated to the new image. FIG. 6 shows an example of an intermediate mix with the slider neither exactly in the middle nor at either extreme end.

Figure 7:
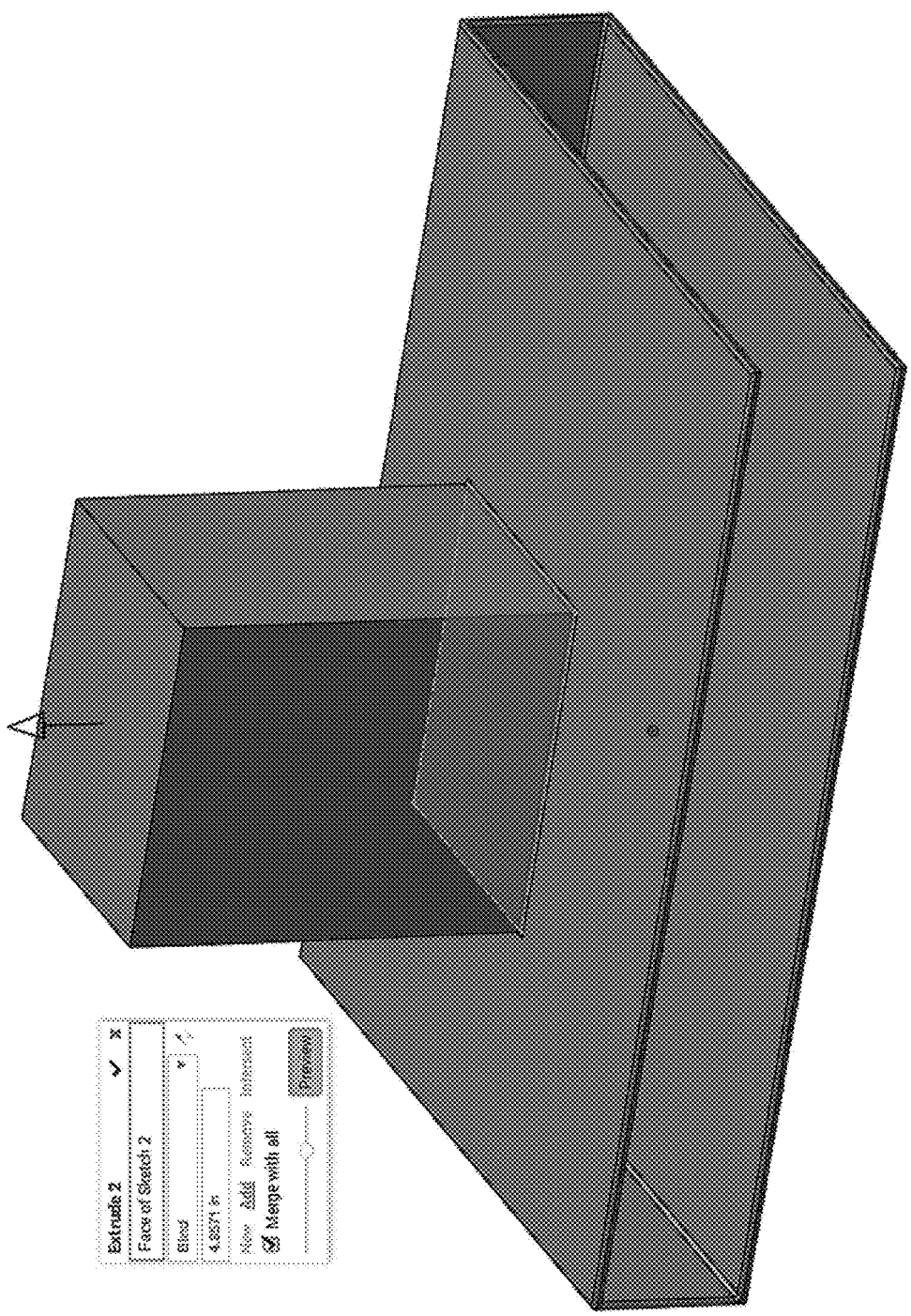
FIG. 7 shows a preview showing the effect of the operation with the entire sequence of operations applied. Notice the preview button is depressed.

Additionally in the preferred embodiment, the user may activate the "Preview" button in slider controls 210. While the slider controls the degree of blending between the state immediately before and immediately after the operation is applied, as shown in FIG. 7 the "Preview" button causes display of the applied edited or new operation and also application of the sequence of operations which are applied after edited or new operation. Activating the "Preview" button signals the geometry service that the user wants the preview. The geometry service then generates the set of geometry for all geometric operations, including the input parameters 200 for the actively edited operation. This geometry is then fed to the renderer to produce an image. The renderer only produces one image, and the compositor may be bypassed or simply passes the image onto the display. At this point the user sees the result.

After a complete preview, the user may activate a button, either a separate button or re-activation of the "Preview" button, or adjust the slider control, to return to the blended preview view. They may also use other user interface controls to end editing of the operation, either accepting or canceling the operation parameter changes. This returns to a standard 3D CAD user interface view, where the user can initiate further changes or perform other standard operations.

Other Embodiments

The preview method may use other user interface designs for adjusting the visualization output, besides the preferred slider control with "Preview" button. For instance, the interface can be configured as one continuous slider that transitions between the three states: before the operation (at the left), after the operation (in the middle), and preview of all operations (at the right). Alternatively, fixed percentage choices may be presented, such as a drop-down menu or radio boxes allowing "before," "25% blend," "50% blend," "75% blend," "after," or complete "preview." As another example, a text-input box may be used to input and specify the specific blend percentage. Any interface that controls the transition between these states can determine the final result of the preview visualization.

The preview method may animate the transition between states. For instance, when the user first begins editing a geometric operation, the software may start the preview visualization showing the state before the operation is applied. It may then animate the visualization between the state before the edit is applied to the point after which the edit is applied. Such animation draws the user's attention to what has changed in their design.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for previewing geometrical operation changes within a three dimensional computer aided design (3D CAD) software program, comprising:
   operating a computer device to display a user interface of the 3D CAD program;
   displaying interface controls to add or edit a geometric operation in a sequentially ordered list of geometric operations, wherein applying the geometric operations in ordered sequence generates a design, and wherein the geometric operation being added or edited may come before a last geometric operation in the ordered sequence;
   displaying interface controls within the user interface to adjust parameters of the geometric operation being added or edited;

providing a preview control attached to or included with the interface controls, wherein the preview control allows selection between a before geometric operation display, an after geometric operation display, a blend of before and after display, and a complete preview; and rendering, within the user interface, a model of the design based on the preview control selection while changes are made to parameters of the geometric operation before committing the changes to the design.

2. The method of claim 1, further comprising providing a slider within the preview control for controlling blend of before and after display.

3. The method of claim 2, further comprising controlling the slider through input to the computer device such that moving the slider to a far left position causes display of the model before the geometric operation is applied, moving the slider to a far right position causes display of the model immediately after the geometric operation is applied, and moving the slider in between the far positions causes display of a blend of before and after proportional to the slider position.

4. The method of claim 2, further comprising:
sending parameters of the geometric operation to a geometry service;
producing, by the geometry service, a first set of geometry corresponding to the sequence of geometric operations up to but not including the geometric operation being added or edited;
producing, by the geometry service, a second set of geometry corresponding to the sequence of geometric operations up to and including the geometric operation being added or edited;
sending the first and second sets of geometry to a renderer;
producing a first image based on the first set of geometry and a second image based on the second set of geometry;
sending the first and second images and the position value of the slider to a compositor, where the position value is on or convertible to a zero to one hundred percent scale;
producing, by the compositor, a third image by proportionally combining the first and second images, where the first image proportion is one hundred percent minus the slider value, and where the second image proportion is the slider value; and
providing the third image for rendering as the model.

5. The method of claim 1, further comprising providing a preview button within the preview controls wherein selecting the preview button causes the rendered model to display with geometric operations applied, including all geometric operations sequentially before the geometric operation being added or edited, the geometric operation being added or edited, and all geometric operations sequentially after the geometric operation being added or edited.

6. A system for previewing geometrical operation changes within a three dimensional computer aided design (3D CAD) software program, comprising:
a computer having a processor operating software configured to display a user interface of the 3D CAD program;
one or more interface controls within the user interface displayed for adjusting parameters of a geometric operation being added or edited for a design, wherein the geometric operation being added or edited is within a sequentially ordered list of geometric operations and may come before a last geometric operation in the ordered sequence, and wherein applying the geometric operations in ordered sequence generates the design;
a preview control attached to or included with the one or more interface controls, the preview control configured to allow selection between a before geometric operation display, an after geometric operation display, a blend of before and after display, and a complete preview; and
wherein the software is configured to render, within the user interface, a model of the design based on the preview control selection while changes are made to parameters of the geometric operation before committing the changes to the design.

7. The system of claim 6, further comprising a slider within the preview control configured to control blend of before and after display.

8. The system of claim 7, wherein the slider is further configured such that moving the slider to a far left position causes display of the model before the geometric operation is applied, moving the slider to a far right position causes display of the model immediately after the geometric operation is applied, and moving the slider in between the far positions causes display of a blend of before and after proportional to the slider position.

9. The system of claim 7, wherein the software is further configured to send parameters of the geometric operation to a geometry service;
wherein the geometry service is configured to produce a first set of geometry corresponding to the sequence of geometric operations up to but not including the geometric operation being added or edited;
wherein the geometry service is further configured to produce a second set of geometry corresponding to the sequence of geometric operations up to and including the geometric operation being added or edited;
wherein the software is further configured to send the first and second sets of geometry to a renderer;
wherein the renderer is configured to produce a first image based on the first set of geometry and a second image based on the second set of geometry;
wherein the software is further configured to send the first and second images and the position value of the slider to a compositor, where the position value is on or convertible to a zero to one hundred percent scale;
wherein the compositor is configured to produce a third image by proportionally combining the first and second images, where the first image proportion is one hundred percent minus the slider value, and where the second image proportion is the slider value; and
wherein the third image is used for rendering as the model.

10. The system of claim 6, further comprising a preview button within the preview controls configured such that selecting the preview button causes the rendered model to display with geometric operations applied, including all geometric operations sequentially before the geometric operation being added or edited, the geometric operation being added or edited, and all geometric operations sequentially after the geometric operation being added or edited.

* * * * *